Figure 1:
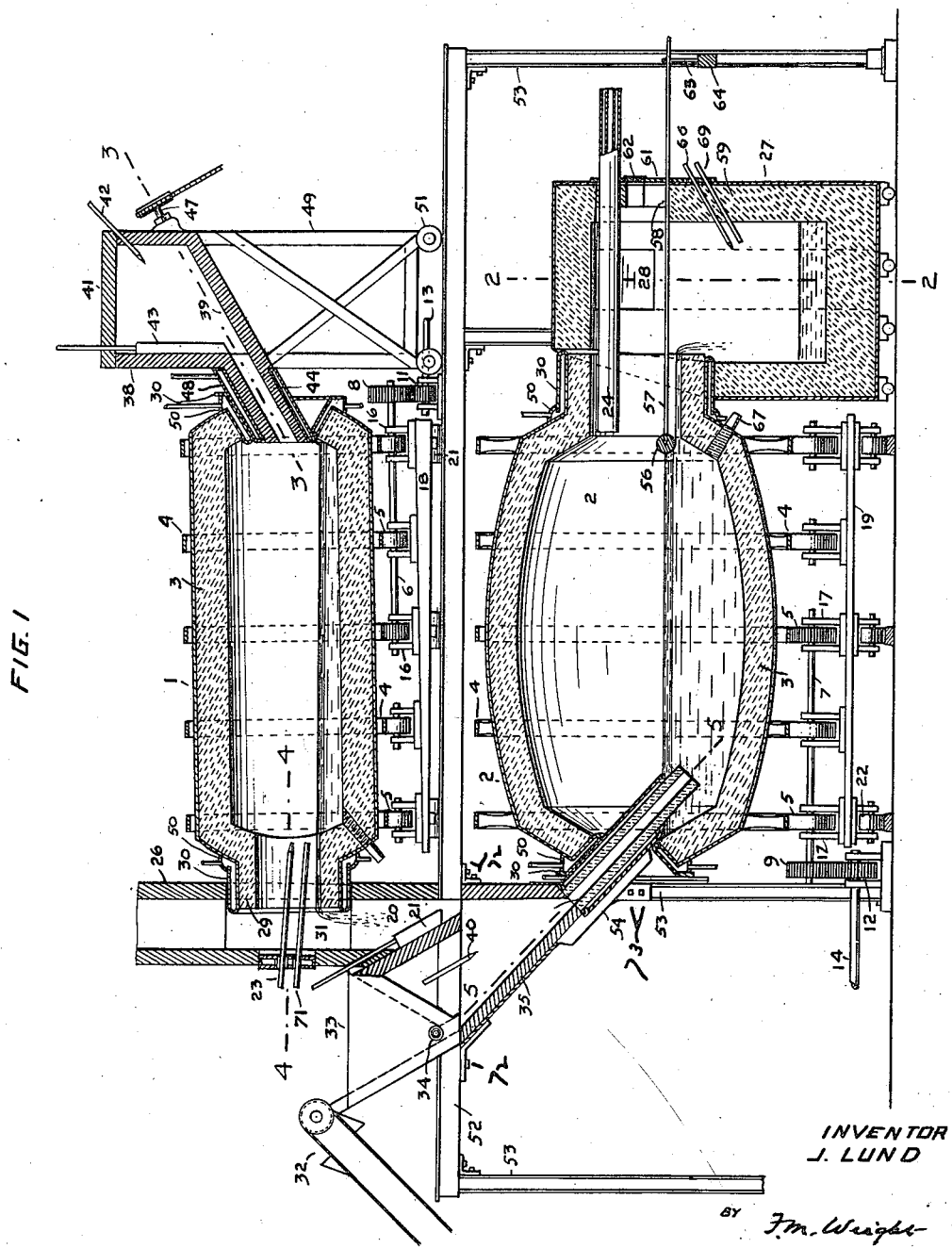

J. LUND.
METALLURGICAL PROCESS.
APPLICATION FILED JAN. 10, 1918.

1,320,483.

Patented Nov. 4, 1919.
2 SHEETS—SHEET 1.

INVENTOR
J. LUND

BY F. M. Wright
ATT'Y.

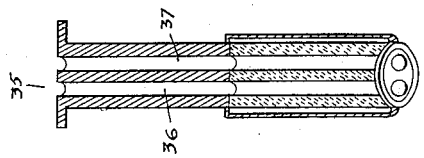
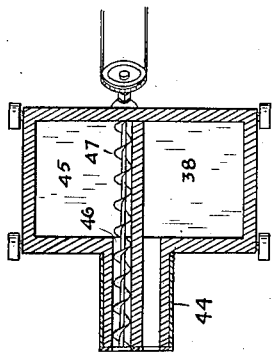
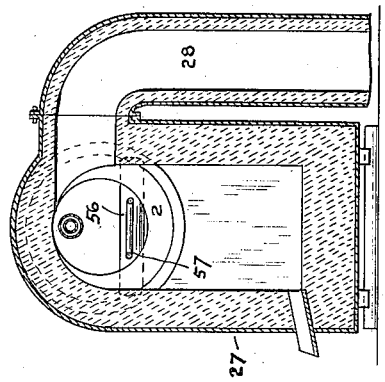
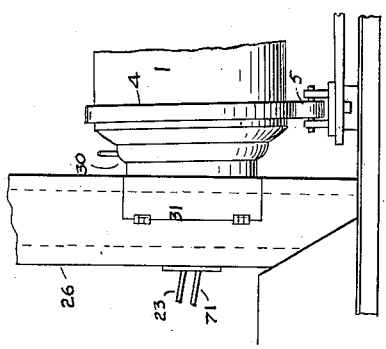
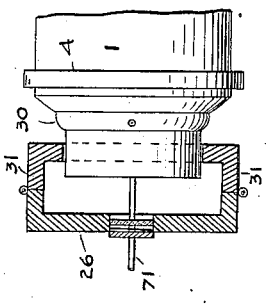

UNITED STATES PATENT OFFICE.

JOEL LUND, OF SAN FRANCISCO, CALIFORNIA.

METALLURGICAL PROCESS.

1,320,483.  Specification of Letters Patent.  Patented Nov. 4, 1919.

Application filed January 10, 1918. Serial No. 211,269.

*To all whom it may concern:*

Be it known that I, JOEL LUND, a citizen of the United States, residing at San Francisco, in the county of San Francisco and State of California, have invented new and useful Improvements in Metallurgical Processes, of which the following is a specification.

The object of the present invention is to provide an improved process of smelting and refining metalliferous material and simultaneously refining the slag produced for repeated use.

One of the primary objects of my invention is to produce steel direct from the ore.

Another object in the smelting of iron ores is to provide a process whereby the full heating value of liquid fuel may be utilized and yet the oxidation of the iron produced may be avoided.

A further object is to provide rapid and efficient means for the qualifying, heating and purification of the slag produced, said slag to be used repeatedly as a protection against oxidation, as a heating medium and as a flux.

A further object in the process of smelting is to apply heat to the under, as well as the upper, surface of the material treated and yet keep one side of the furnace bottom comparatively cool.

A further object is to provide a method for the smelting of finely divided ores and to use hydro-carbons as fuels.

In the usual blast furnace process for the smelting of iron ore, the use of an excess of carbon is necessary and this element as well as the impurities in the ore must be eliminated in another apparatus in order to make steel.

My invention provides a process of the reduction of the ore without excess of carbon.

In the accompanying drawing, Figure 1 is a longitudinal vertical section of an apparatus for carrying out my improved process; Fig. 2 is a vertical transverse section on the line 2—2 of Fig. 1; Fig. 3 is a detail horizontal section on the line 3—3 of Fig. 1; Fig. 4 is a transverse section on the line 4—4 of Fig. 1; Fig. 5 is a horizontal section on the line 5—5 of Fig. 1; Fig. 6 is a detail front elevation.

Referring to the drawing, 1 indicates a slag furnace, and 2 a smelting furnace, the interior of each being lined with refractory slag-resistant material 3. Said furnaces are formed on the outside each with a series of rings or wheels 4, which are supported by rollers 5 on shafts 6, 7, respectively, rotated by gear wheels 8, 9, respectively, meshing with gear wheels 11, 12, on shafts 13, 14, respectively, rotated from any suitable source of power.

Said shafts 8, 9, rotate in bearings 16, 17, which are supported by platforms 18, 19, which can move transversely on rollers 21, 22, so that, when desired, said furnaces can be moved in a direction transverse to their length.

The slag furnace 1 and the metal furnace 2 are supplied with fluid or pulverized solid fuel, by burners 23, 24, which enter the furnaces at one end thereof. The products of combustion from the furnace 1, after circulating around the entire length of the furnace, escape by a chimney 26 at the same end as the burner 23. The products of combustion from the furnace 2, after likewise circulating around said furnace, escape at the burner end of the furnace, and pass into a settling chamber 27, in a side of which is a flue 28 extending downwardly whereby the hot waste gases can be utilized in any desired manner before they enter a stack, not shown.

The connection between the furnace 1 and the chimney 26 is made by means of a comparatively narrow neck 29. To permit the slag furnace to be moved transversely after certain periods, the sides of the chimney next to that through which the neck of the furnace enters are each cut away sufficiently to permit the neck to pass transversely through said sides, so that the neck of one slag furnace passes through one of said cutaway sides while that of the other slag furnace passes through the opposite cutaway side. These cutaway sides are closed, when the furnace is in the proper position, by chimney sections 31.

The ore to be smelted is pulverized or comminuted, and is mixed with a proper amount of pulverized carbon and a small quantity of suitable flux and ground with a solution of carbonate of an alkali metal, and the mixture is formed into briquets of a preferably spherical form so as to facilitate the feeding of the same into the furnace. The quantity of carbon which is so mixed with the ore determines the extent to which the metal is carburized in the process. By grinding the materials involved, in a suitable vessel in the presence of said alkaline solution, an intimate mixture of said materials is obtained, thus promoting a rapid reduction of the same in the furnace. These briquets are conveyed by an elevator 32 to a hopper 33 and transferred from said hopper by a feed screw 34 which rotates in the bottom of the hopper 33, so that briquets or other material delivered to the hopper 33 drop into one portion of the feed screw 34 and are translated by said feed screw until they reach the top of one compartment 36 of a chute 35 and drop into said compartment. In the other compartment 37 of said chute is fed slag from the rotating furnace 1, said slag overflowing from said furnace into a conduit 20 controlled by a gate 21 and being supplied to said furnace 1 by means of a hopper 38. The charge and slag in the hopper 35 are heated by a burner 40. The slag is charged into the hopper 38 through the top which is afterward closed by a shutter 41. Said slag is maintained hot in said hopper by means of a burner 42, and a gate 43 limits the rate at which the slag is permitted to escape by a chute 44 from the hopper. A second hopper 45 is located adjacent to the first hopper 38 and discharges by an opening 46 into the chute 44. Basic or acid material as may be found necessary to properly proportion for qualifying the slag to render it a more efficient fluxing agent is contained in said hopper 45 and is conveyed as desired by means of a feed screw 47. The chute 44 discharges into the end of the rotating furnace 1 opposite to the burner 23 and is maintained comparatively cool by means of a water jacket 48 therearound. Said hoppers are supported upon a suitable frame 49, which can be moved to and from the furnace 1 by means of rollers 51.

I provide, however, in the slag furnace 1 a bottom layer of molten iron, the depth of molten iron being sufficient only to cover the bottom of said rotating furnace and not to escape through its neck. The upper layer of slag is always escaping through the neck, leaving the iron permanently in the vessel.

The double chute 35 removably depends from a platform 52 supported by standards 53 and is secured to said platform by screws 72, its lower part being supported by a cradle 54 attached to the standard 53 by screws 73. When it is desired to move the furnace 2 transversely, this double chute 35 is detached from the platform 52 by unscrewing the screws 72 and from the standards 53 by unscrewing the screws 73 and its upper part is lowered so that the lower part extends horizontally and can thus be removed from a hole in the end of the furnace 2 through which it formerly projected.

By means of this arrangement said briquets and slag are fed into the furnace 2 below the surface of the molten material therein. Said material consists of carburized molten metal and a layer of slag floating thereon. These are heated by the fluid fuel burner 24 which heats the upper part of the furnace 2, and by reason of the rotation of said furnace, the heated upper portion is continually moved below the molten bath which is thereby heated. The height of the layer of slag is governed by the height of a cylindrical slag dam 56 which is supported by the central portion of a yoke-shaped piece of pipe 57, the middle portions of the side of said yokes extending through grooves or depressions 58 formed in the bottom of a hole in a wall 59 of said settling chamber which is closed by a door 61, said door having therein a mica window 62 and carrying the burner 24. Upon the outer ends of said sides of the yoke are hangers 63 which support weights 64, by adding to or substracting from which, the slag dam 56 may be raised or lowered correspondingly.

As the level of the slag rises in the furnace 2, the slag dam also rises, thus permitting metal to flow underneath the dam into the settling chamber. Since the effective weight of the slag dam is accurately counterbalanced by the weight of the counterweight, it results that any increase in thickness of the layer of slag will cause said slag dam to rise and permit a certain amount of slag, as well as metal, to flow beneath the slag dam. The metal settles to the bottom of the settling chamber, and to insure such separation by gravity the liquids in the settling chamber are maintained hot by means of a burner 66. The metal is drawn off from time to time from the settling chamber by a tap hole 67 and the slag is then drawn off through the same hole and is elevated by suitable means and discharged into the slag hopper 38.

Before so drawing it off from the settling chamber the slag is purified by means of a blast of steam through a steam pipe 69. The slag is further purified in the slag furnace 1 by means of steam and air discharged through a pipe 71. The steam is believed to purify the slag in the following manner. There is always a small quantity of metal contained in the slag, and this metal takes up the oxygen of the steam, thereby freeing its hydrogen, which combines with the sulfur in the slag.

At all junctures of open ends of the furnaces 1 and 2 with stationary parts, as the chimney 26, the chutes 44 and 35 and the settling chamber 27, there is provided a water jacket having a stationary wall 50 and a wall moving with the furnace and making a water-tight fit with the wall 50.

As my invention contemplates the production of finished metal from the ore in one operation the various well known fluxes, metals or alloys may be added to the metallic bath and constitute part or the whole of a charge.

It being well known in metallurgy that wet material introduced below the surface of a metallic bath causes explosion by reason of the instantaneous conversion of the moisture into steam, it is understood that all materials composing "a charge" and which are to be submerged in said bath, must previously have had the moisture expelled by any well known means.

By "a charge" in the claims I include any material that may be added to the bath, for increasing its value, or for any other purpose.

The liquid cover, or layer, herewithin mentioned, is not necessarily a slag at the commencement of the process, although its composition is similar to that of a purified slag, but acid and basic materials in proper proportions to form a silicate compound fusible at the temperature of the furnace may be melted down or provided from any suitable source.

Said "liquid cover" acts in practice as an absorbent of sulfur and phosphorus and since by its use it becomes contaminated with said impurities contained in the charge it may, after the commencement of the process, be properly called "a slag". This slag, however, needs to be purified and chemically qualified, as by the addition of acid and basic materials, or either of them alone, in order that it may be used repeatedly in the process.

Fluxes or mixtures already known to be used in smelting and refining to bring about certain results are introduced with, and form a part of, a charge and retain their advantages in my process, with this additional advantage, that the molten slag or liquid cover which continuously enter the furnace in a purified and chemically qualified condition also acts as an effective flux.

I claim:—

1. The process which consists in heating a metallic bath having a cover of slag, drawing off portions of the slag, and supplying purified slag to said metallic bath in sufficient quantities to maintain said bath entirely covered by the slag.

2. The process which consists in heating a metallic bath covered by a layer of slag, continually drawing off portions of the bath and slag, and continually supplying a charge to said bath and slag under the cover of slag.

3. The process which consists in heating a metallic bath and a cover therefor of molten slag, continually drawing off portions of the molten slag, purifying the slag and continually supplying the purified molten slag to the metallic bath.

4. The process which consists in heating a metallic bath and a cover therefor of molten slag, drawing off portions of said bath and slag, purifying the slag and supplying a charge including the purified slag to said bath and slag.

5. The method of obtaining iron and steel directly from the ore, which consists in briqueting the ore together with carbon and a flux, feeding said briquets to a metallic bath under the cover of molten purified slag, heating said bath and cover, withdrawing portions of said bath and cover, purifying and chemically qualifying the withdrawn slag, and supplying said purified and chemically qualified slag in a heated molten condition in sufficient quantities to maintain the bath entirely covered.

6. The method of obtaining iron and steel directly from the ore, which consists in briqueting the ore together with carbon and a flux and a carbonate of an alkali metal in solution, feeding said briquets to a metallic bath under the cover of molten purified slag, heating said bath and cover, withdrawing portions of said bath and cover, purifying and chemically qualifying the withdrawn slag, and supplying said purified and chemically qualified slag in a heated molten condition in sufficient quantities to maintain the bath entirely covered.

7. The method of obtaining iron and steel directly from the ore, which consists in briqueting the ore together with carbon and a flux and a carbonate of an alkali metal in solution, feeding said briquets to a metallic bath under a cover of molten purified slag, heating said bath and cover, withdrawing portions of said bath and cover, purifying, chemically qualifying and heating the withdrawn slag, and supplying said purified, chemically qualified and heated slag in a heated molten condition in sufficient quantities to maintain the bath entirely covered.

JOEL LUND.